United States Patent [19]

Coker

[11] Patent Number: 5,410,479

[45] Date of Patent: Apr. 25, 1995

[54] ULTRASONIC FURROW OR CROP ROW FOLLOWING SENSOR

[76] Inventor: William B. Coker, 2303 High St., Beatrice, Nebr. 68310

[21] Appl. No.: 929,988

[22] Filed: Aug. 17, 1992

[51] Int. Cl.$^6$ .................... G06F 15/50; G08G 1/00
[52] U.S. Cl. .................... 364/424.02; 364/424.05; 180/168; 340/901
[58] Field of Search .................... 364/424.02, 447, 449, 364/424.05, 561, 167; 180/169, 168, 131, 98; 318/567, 587; 340/901, 988; 342/123, 438, 458, 463

[56] References Cited

U.S. PATENT DOCUMENTS

| | | |
|---|---|---|
| 3,493,920 | 8/1968 | MacMunn . |
| 3,744,586 | 7/1973 | Lemauer .................... 180/79.1 |
| 4,049,961 | 9/1977 | Marcy .................... 180/98 |
| 4,077,488 | 3/1978 | Bennett, Jr. et al. .................... 180/98 |
| 4,219,092 | 8/1980 | Richter .................... 378/45 |
| 4,225,949 | 9/1980 | Price et al. .................... 367/96 |
| 4,465,155 | 8/1984 | Collins .................... 180/169 |
| 4,482,960 | 11/1984 | Pryor .................... 364/424.02 |
| 4,537,271 | 8/1985 | Ito et al. .................... 180/131 |
| 4,835,691 | 5/1989 | Rotem et al. .................... 364/424.02 |
| 4,918,362 | 4/1990 | Christensen et al. .................... 318/587 |
| 4,918,441 | 4/1990 | Bohman .................... 340/901 |
| 4,920,520 | 4/1990 | Gobel et al. .................... 367/99 |
| 4,930,581 | 6/1990 | Fleischer et al. .................... 180/131 |
| 5,010,719 | 4/1991 | Korthuis .................... 56/10.2 |
| 5,019,983 | 5/1991 | Schutten et al. .................... 364/424.07 |
| 5,103,924 | 4/1992 | Walker .................... 180/131 |

FOREIGN PATENT DOCUMENTS 2608049 9/1977 Germany .
2025665 1/1980 United Kingdom .

Primary Examiner—Kevin J. Teska
Assistant Examiner—Tan Q. Nguyen
Attorney, Agent, or Firm—John A. Beehner

[57] ABSTRACT

An automated ultrasonic guidance apparatus is adapted to be mounted on a vehicle having a guidance steering system for steering the vehicle on a desired track between adjacent crop rows or sides of a furrow. The apparatus includes first and second sensors for transmitting and receiving ultrasonic ranging signals. The sensors are mountable on a vehicle for directing the ranging signals downwardly and outwardly in opposite directions toward adjacent crop rows or sides of a furrow such that the ranging signals strike the rows or furrow and are reflected back into the respective sensor. Variable ranging outputs from the sensors are operatively associated with the guidance steering system to cause it to steer the vehicle toward the desired track.

9 Claims, 5 Drawing Sheets

ULTRASONIC FURROW OR CROP ROW FOLLOWING SENSOR

BACKGROUND OF THE INVENTION

1. Technical Field

The method and apparatus of the invention relate generally to a means for maintaining a preselected track through crop rows, furrows or the like for agricultural vehicles such as a tractor, cultivator or the like. More specifically, it relates to an apparatus and method of using a dual ultrasonic transducer to detect lateral displacements from a predetermined track between two crop rows, furrows, plowing marker furrows or the like. Throughout, this specification, furrows will be meant to include also crop rows, marking furrows and the like. Further, any signal error from vertical displacement of the vehicle is eliminated by use of the dual transducer system to produce a signal verification. Additionally, any noise generated from various debris in the path of the vehicle is filtered out.

This invention is documented in Disclosure Document No. 303806 received in the Patent and Trademark Office on Mar. 10, 1992.

2. Description of the Prior Art

Several techniques have been suggested in the prior art for allowing a tractor or other agricultural vehicle to avoid obstacles or maintain a specified vertical separation with the ground. One example of such a prior device is Ito et al., U.S. Pat. No. 4,537,271, which describes a non-contact type obstacle sensor mounted on the front portion of a running vehicle. The sensor determines whether an obstacle detected ahead of the vehicle is moving or stationary. If the obstacle is stationary, the vehicle is turned so as to cause it to detour around the obstacle. If the obstacle is in motion, the vehicle is stopped. The preferred sensor of this invention is a photo sensor which is used to emit a beam of light and then to detect the reflection of the light from the obstacle.

Another example of a prior art device is Phelan, U.S. Pat. No. 5,060,205, which describes a distance sensing system including an ultrasonic transducer, a transceiver and a micro controller-based signal processing unit. The device measures a vertical distance between the terrain and the sensor, and is not used for determining a lateral displacement measurement for use in controlling the tracking of a vehicle down a desired path.

A problem previously encountered with these types of devices for use with automated guidance systems, was that the ultrasonic sensor being much more sensitive to field debris, would transmit any and all debris (i.e., clods, plant stalks, etc.) in addition to the furrow surface. The output signal was essentially useless, due to the amount of random noise caused by this debris. Additionally, many of these devices may only be used with that manufacturer's equipment.

Several manufacturers have supplied steering guidance systems for agricultural vehicles wherein the wheels of the vehicle may be turned based on a variable voltage or current input to the guidance system. Several devices have been developed to generate this variable voltage for the guidance systems. Generally, these devices comprise mechanical potentiometers which sense when a tracking wheel has deviated from the predetermined path. The potentiometer sends a variable voltage to the vehicle's guidance steering system which in turn activates a mechanical linkage to move the wheels, thereby correcting the deviation. A major drawback of this type of system is the mechanical nature of the translation from lateral displacement to steering commands through the potentiometer. Another drawback is the precision with which the potentiometer is able to change values. Potentiometers are also generally fragile and tend to wear out quickly. Further, these systems can generally only be used with that manufacturer's equipment.

Another means of providing steering signals to agricultural vehicles is through heavy and cumbersome ground sensors which travel along the bottom and middle of the row. These sensors utilize freely moving "rabbit ear" mechanical feelers or heavy metal "balls" connected to a potentiometer or Hall-effect transducer in the center, rotating laterally as the ridges move closer or farther. The user sometimes will try to back up with the vehicle, and "hook" the reversed-angle feelers or metal balls on plant stalks or the ridge itself and either bend or break the otherwise fragile feelers or balls.

None of these prior art devices teach the unique apparatus and method of the present invention whereby a tractor or other agricultural vehicle is able to maintain a constant preselected track through a crop row and to filter out debris detection and vertical movements of the vehicle caused by bumps in the track.

Accordingly it is a primary objective of the present invention to provide an apparatus which is capable of maintaining a constant preselected desired track through crop rows, furrows, plowing mark furrows or the like, thereby allowing the tractor or other agricultural vehicle to track down a crop row, furrow or plowing mark furrow.

Another object of the present invention is to provide an apparatus which is capable of filtering out any signal noise generated by debris and the like, providing a valid signal indicative of the furrow surface, plant stalk bottom or crop row.

Another object of the present invention is to provide an apparatus which is capable of discriminating between valid lateral movements of the tractor or vehicle and invalid vertical movements caused by bumps in the crop row or the like.

Still another object of the present invention is to provide an apparatus which may be utilized with existing guidance control equipment utilizing a variable input voltage or current to control steering of the vehicle's wheels, present on many of today's agricultural vehicles.

Another object of the present invention is to provide an apparatus which is capable of using off-the-shelf transducer sensors.

A final objective of the invention is to provide an apparatus which is simple and inexpensive yet able to accomplish the above mentioned objectives.

SUMMARY OF THE INVENTION

The automated ultrasonic guidance apparatus of the present invention includes a first and second sensor means operative to transmit and receive ranging signals. Mounting means attach the sensor means to a vehicle such that the ranging signals are directed outwardly toward a crop row or furrow. The signals strike the row or furrow and are reflected back toward the sensor. First and second signal processing means process the ranging signals. A signal composition means combines and compares the ranging data from the processing such that lateral displacement of the vehicle are determined and the displacement data is converted into steering commands. The steering correction commands are transmitted to conventional guidance steering means of the vehicle which is then steered back to the desired track.

The method of the present invention includes providing a pair of ultra sonic sensors and orienting them such that ranging signals emitted therefrom strike adjacent crop rows or sides of a furrow or plowing mark furrow. A variable output is generated by the sensors which is indicative of the distance of the sensor from the crop row, furrow or plowing mark furrow. The output is filtered and multiplied to eliminate noise and increase sensitivity. The outputs are then compared to determine if a valid lateral displacement has occurred and if so, a steering correction command is generated and transmitted to the vehicle's guidance steering system.

DESCRIPTION OF THE PREFERRED EMBODIMENT

Figure 1:
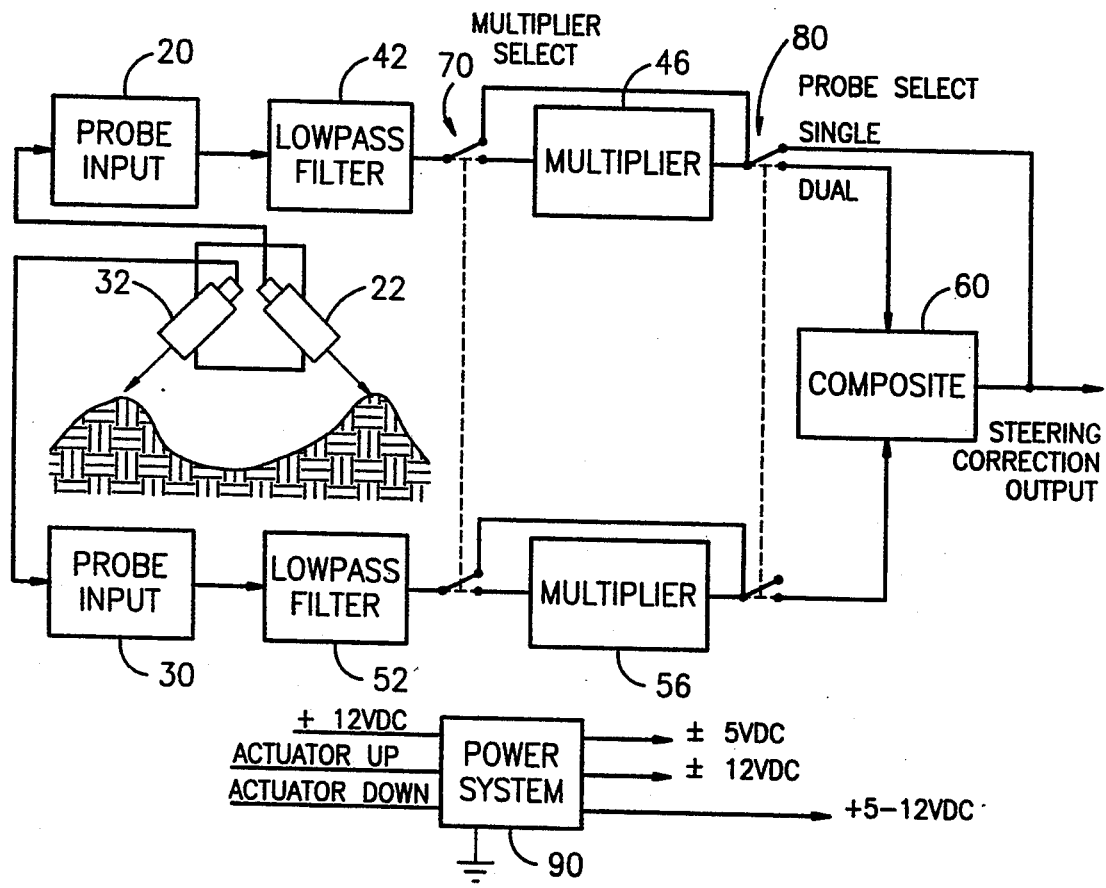
FIG. 1 is a block diagram of the invention showing major components thereof.

The overall structure and interconnection of the invention's components is best illustrated in FIG. 1. As shown in the figure, ultrasonic transducers 22 and 32 are shown attached to an agricultural vehicle and are each pointed downwardly and outwardly in opposite directions such that each probe is directed towards adjacent crop rows, sides of a furrow, plant stalk bottom or the like. The ultrasonic signal transmitted from each transducer strikes an adjacent row and is reflected back into the transmitting transducer. As the vehicle moves laterally, the distance from one sensor will increase while the distance to the other sensor decreases. Each ultrasonic transducer's focusing angle, lateral distance between transducers and horizontal distance between transducers, can be adjusted to adapt for varying types of row conditions, row flatness, width, etc., to provide good performance in all conditions.

In the preferred embodiment, the ultrasonic transducers are Series PCU "Ultrasonic Proximity Sensors" from ELECTRO Corporation. However, the transducers may be any one of a number of commercially available ultrasonic transducers, wherein an ultrasonic ranging signal is transmitted outwardly until it strikes an object and is then reflected back into the transducer. The transducer then measures the elapsed time for the ultrasonic pulse to travel to the object and back to the transducer and computes the distance from this travel time based on the speed of sound. This distance is then converted into a variable voltage ranging signal. The variable voltage ranging signal generated by the transducer is proportional to the distance of the reflecting object from the transducer. In transducers such as the series PCU Ultrasonic Proximity Sensor from ELECTRO Corporation, the operative range of the transducer is four to thirty (4–30) inches or eight to seventy-two (8–72) inches, depending on the mode of operation. A variable voltage of zero to five (0–5) volts DC is generated corresponding in direct proportion to the distance between the sensor and the object. Alternatively, the ranging output of other commercially available transducers may be a variable current, binary code or any output which correlated to the measured distance. Once the distance has been converted into a corresponding proportional ranging signal voltage by transducers 22, 32, the ranging signal voltage is then transmitted to first and second input buffers 20 and 30.

Figure 3:
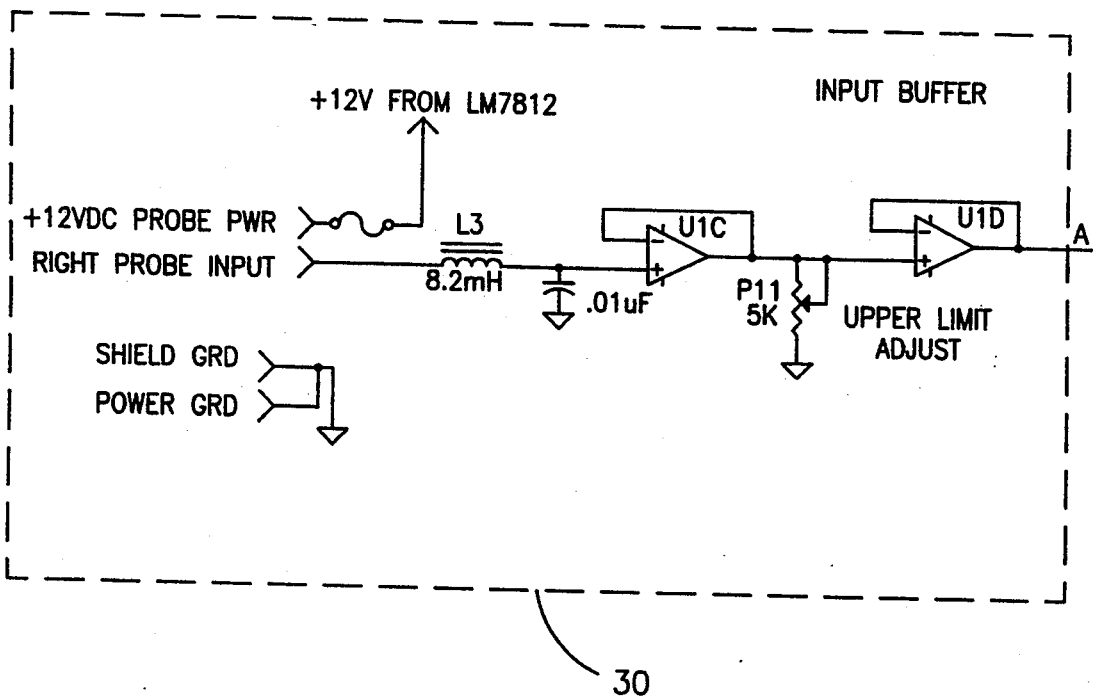
FIG. 3 is an electrical schematic of sensor interface.

Input buffers 20 and 30, shown in greater detail in FIG. 3, consist of four Operational Amplifiers. Input Buffers 20 and 30 serve to protect the remaining circuit from any voltage anomalies or transients from the probes and also allow the operator to adjust the upper limit of the variable ranging signal's voltage. After input buffers 20 and 30 process the signal, the variable ranging signal is transmitted to first and second lowpass filters 42 and 52.

Figure 4:
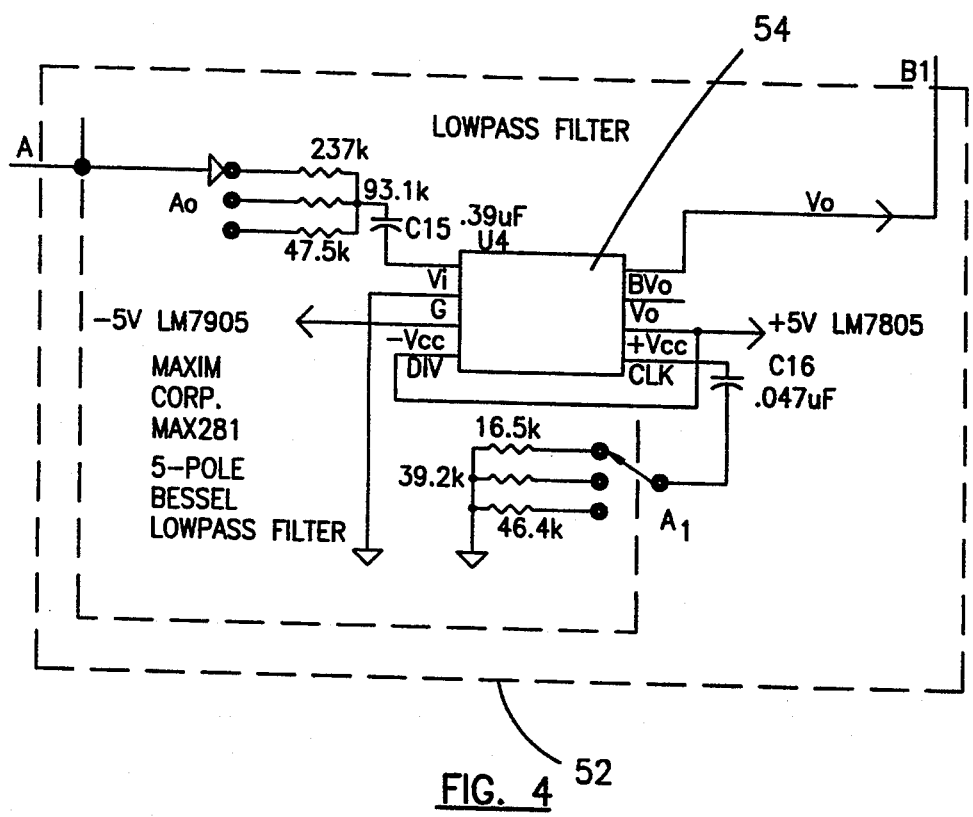
FIG. 4 is an electrical schematic of the low pass filter.

Each of the lowpass filters 42 and 52 may be either a five pole Bessel filter as illustrated in FIG. 4, a five pole Butterworth filter such as LT1062 of Linear Technology Corp., or any other suitable filter. The filters eliminate noise caused by reflected signals from debris and the like in the rows. This is accomplished by setting the filter cutoff frequency anywhere from 0.1 Hertz to 10 Hertz, depending on the type and amount of debris anticipated. After debris noise has been filtered by lowpass filters 42 and 52, the filtered ranging signals are passed to multipliers 46 and 56 via multiplier switch 70.

Switch 70 allows the operator to bypass the multiplier function of multipliers 46 and 56 and to use the raw filtered ranging signal data for calculating the steering correction commands when switch 70 is in the "OFF" position. If switch 70 is placed in the "ON" position, filtered ranging signal data from lowpass filters 42 and 52 is transmitted to Multipliers 46 and 56.

Multipliers 46 and 56 multiply the filtered ranging signal by itself, thereby squaring the signal and increasing the sensitivity of the ranging signals to any change ($x^2$) in distance of transducer sensors 22 and 32 from the rows or furrow sides. The system is thereby made very sensitive to any displacement of the agricultural vehicle from the desired track and consequently is able to quickly compensate for any such deviations. After multiplication, the squared ranging signals are passed through switch 80, which allows the system to use either a single or dual probe configuration.

In a single probe configuration, the output of multiplier 46 is conditioned by non-inverting amplifier 81 (FIG. 8) and is then used as the steering correction output. In a dual probe configuration, the outputs of multipliers 46 and 56 are combined in composite circuit 60. Use of two ultrasonic ranging probes in conjunction with compositing circuit 60 eliminates the effect of vehicle bounce by discarding displacement data if one probe sees an increase in range but the other probe does not see a corresponding decrease in range. In other words, if both probes indicate an increase in range or a decrease in range data simultaneously, this indicates the vehicle is in a vertical rather than in an horizontal displacement and therefore the system disregards such ranging displacement data.

Composite Circuit 60 comprises an inverting summer 62 and comparator 66 (both shown in FIG. 6) which algebraically add and compare the two squared ranging signals to form one steering correction output. In the preferred embodiment, the steering correction output signal is a voltage centered nominally about 2.5 volts. Alternatively, the correction signal may be adjusted as necessary, to represent a zero steering command. The steering correction output is then sent to the vehicle's existing guidance steering system.

Two examples of such vehicle guidance systems are the "Buffalo" system manufactured by Fleischer Manufacturing, Inc. and the "Acura-Trak" system manufactured by Sunco Systems, Inc. In the event that a lateral displacement from the desired track is discovered, the steering correction output voltage from the composite circuit 60 (or multiplier 46 depending on whether a single or dual probe configuration is used) is varied based on the amount and direction of steering compensation required and in conformity with the conventional guidance steering system of the vehicle being used. For example, in the "Buffalo" guidance system, an input voltage to the system of between zero and 2.5 volts indicates a left turn is required, the degree of turn being proportional to the deviation of the voltage from 2.5 volts. Conversely, if a right turn is desired, the voltage is varied between 2.5 and 5 volts again with the amount of deviation from the neutral 2.5 volts determining the sharpness of the turn. The composite circuit 60 generates this voltage and sends it to the guidance steering system. The range of voltage variation as well as center voltage may be changed to accommodate different systems.

System power is supplied by power supply 90. The power supply produces ±5 volts dc and ±12 volt dc in addition to +5-12 volt dc, for all ICs and circuit components.

Figure 2:
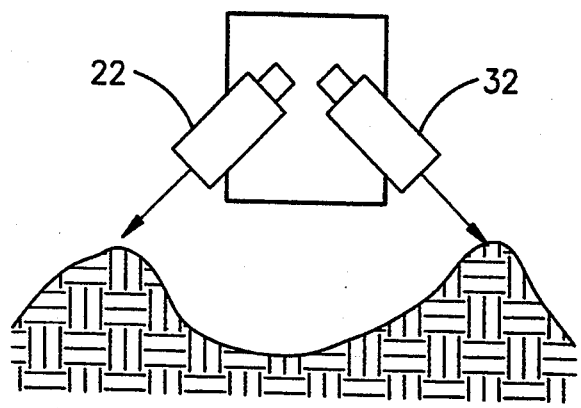
FIG. 2 is a front view of the ultrasonic sensor probes of the invention and their directional orientation relative to the row or furrow.

The mounting and directional orientation of transducers 22 and 32 is shown in FIG. 2. As can be seen from the figure, the transducers are mounted on the vehicle and are directed downwardly and outwardly in opposite directions such that the ultrasonic beams emitted from each transducer are directed toward the sides of a furrow and/or the bottom of plant stalks in the adjacent crop rows. The beams are then reflected back into transducers 22 and 32 after striking the rows or furrow. The distance from transducer 22 or 32 to the crop row or furrow is determined based on the amount of time taken for the ultrasonic ranging signal to be transmitted from the transducer to the row and then reflected back to the probe. It will be noted that in a lateral movement of the vehicle, the distance of one probe to a row will increase while the distance from the other will decrease. The probe mathematically computes this distance based on the speed of sound. This distance is then translated into a variable voltage ranging signal, the level of which varies proportionally with the distance. In the preferred embodiment, the transducers are "Series PCU Ultrasonic Proximity Sensors" produced by Electro Corporation. However, the sensors may be any of a number of commercially available ultrasonic transducers wherein the output is proportionally variable according to the distance from the sensor to the object measured. The variable output may be binary code, voltage, current or any other output which correlates to the measured distance. In transducers such as the series PCU Ultrasonic Proximity Sensor from ELECTRO Corporation, the operative range of the transducer is four to thirty (4–30) inches or eight to seventy-two (8–72) inches, depending on the mode of operation. A variable voltage of zero to five (0–5) volts DC is generated corresponding in direct proportion to the distance between the sensor and the object.

FIGS. 3 through 9 show individual sections of the electrical circuit in greater detail. FIG. 3 shows in detail the electrical components making up input buffer 30 for the second (right) transducer 32 of the system. An identical electrical circuit is used for input buffer 20 of the left or the first transducer 22 but is not shown in the figure. Sensor ranging output variable voltage is input to the buffer through choke L3 used to filter out any radio frequency (rf) interference on the probe voltage. The ranging signal is then input into a voltage follower comprising Op Amp U1C and Op Amp U1D through potentiometer P11. Both U1C and U1D are each one quarter of an LM324 quad Op Amp. Potentiometer P11 allows the upper voltage limit of the ranging signal to be adjusted. The variable ranging output is then input into low pass filter 52.

The electrical component details of second low pass filter 52 are shown in FIG. 4. An identical electrical schematic is used for first filter 42 but is not shown. Low Pass filters 42 and 52 are used to eliminate noise from the variable ranging output caused by debris and the like located adjacent the rows or furrow. Generally, the surface will reflect essentially a DC or 1-3 Hertz signal. Therefore, any higher frequency signals are probably noise from debris and the like and may be filtered out. The heart of low pass filter 52 is integrated circuit U4 which is a 5-pole Bessel or Butterworth low pass filter. In the preferred embodiment U4 may be either a MAX281 Bessel or LT1062 Butterworth filter. Resisters R30-35 in conjunction with capacitors C15 and C16 determine the cut-off frequency of low pass filter 52. In the preferred embodiment, the filter cut-off frequency is set anywhere from 0.1 Hertz to 10 Hertz depending on the type and amount of debris anticipated. The cut-off frequency of the filter may be adjusted by means of switches A0 and A1 wherein different values of resistors are selected to be used in conjunction with capacitors C15 and C16, thereby determining the cut-off frequency of the filter.

Figure 7:
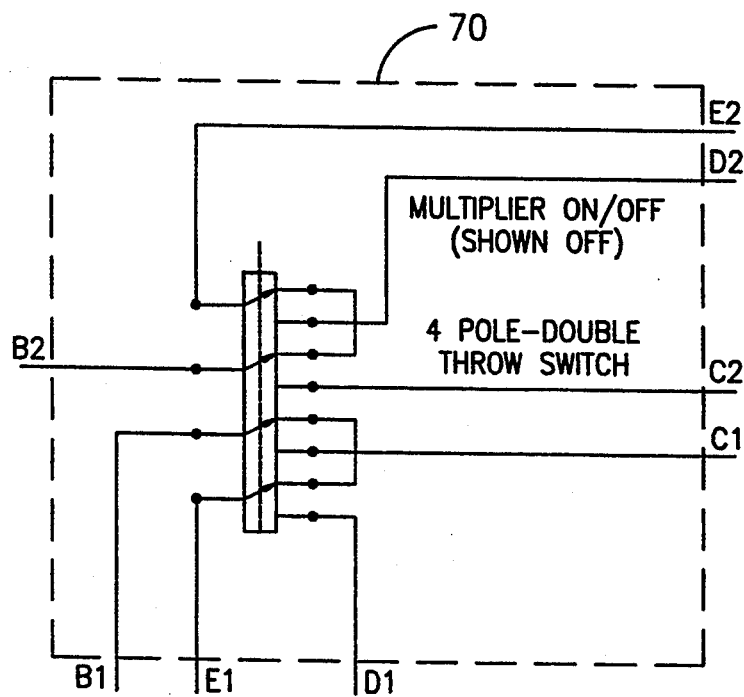
FIG. 7 is an electrical schematic of the multiplier ON/OFF switch.

After high frequency noise data has been filtered from the variable ranging output by low pass filters 42 and 52, the filtered ranging output is passed to multiplier 56 through switch 70 shown in FIG. 7. Switch 70 has ON and OFF positions which allow the operator to bypass the multiplication function of multiplier 56 when switch 70 is in the "OFF" position and use the filtered variable ranging output from low pass filters 42 and 52 directly to the generate steering correction output. If the operator desires to use the multiplication function of multipliers 46 and 56, the operator places switch 70 in the "ON" position, thereby directing, filtered ranging output from low pass filters 42 and 52 to multipliers 46 and 56. In the figure, B1 represents the signal from the second (right) low pass filter 52 and B2 represents the signal from the first (left) lowpass filter 42. C1, D1, and E1 all represent signals to the right multiplier 56 and output buffer 59 and C2, D2, E2 all represent signals to the left multiplier 46 and output buffer 49.

Figure 5:
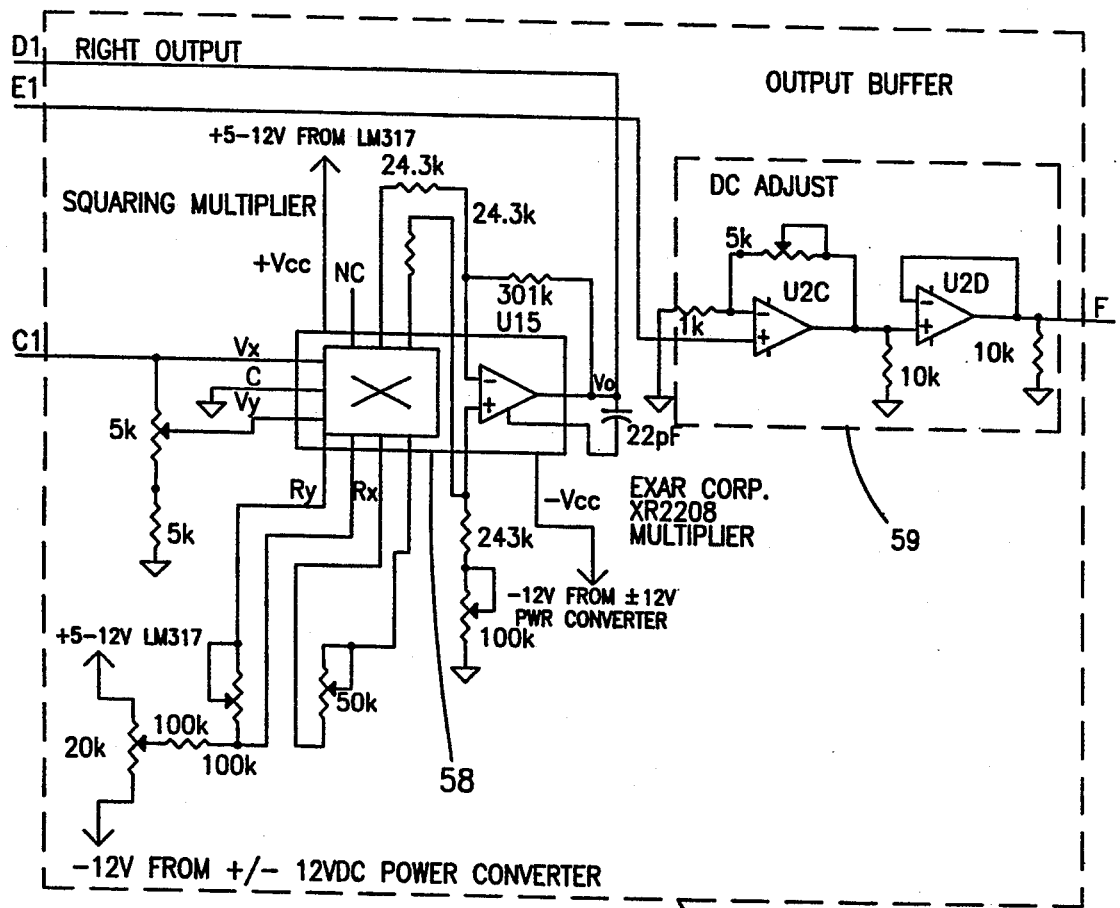
FIG. 5 is an electrical schematic of the multiplier and output buffer.

Multiplier 56 for use with the second (right) transducer sensor is shown in detail in FIG. 5. A corresponding and identical electrical circuit 46, not shown, is used in the first (left) transducer sensor 22. Multiplier 56 comprises multiplier integrated circuit U15 which in the preferred embodiment is an EXAR 2208 operational multiplier. The effect of multiplier 56 is to multiply the filtered ranging output by itself, thereby squaring the output. This greatly enhances the sensitivity ($x^2$) of the ranging output to any lateral displacements detected by the transducer. Therefore, any small lateral displacement detected, will produce a larger deviation in the voltage away from a reference 2.5 volts. Thus, the vehicle is very sensitive to any displacements from the desired track so that such displacements may be quickly sensed and corrected. The resulting squared ranging output is then transmitted to output buffer 59 which comprises U2C and U2D. In the preferred embodiment, U2C and U2D are each one quarter of a LM324 quad Op Amp. The output buffer conditions the ranging system for use by the composite circuit 60. An identical electrical circuit for the output buffer 49 is used for the first (left) transducer probe 22 but is not shown in the figure.

Figure 6:
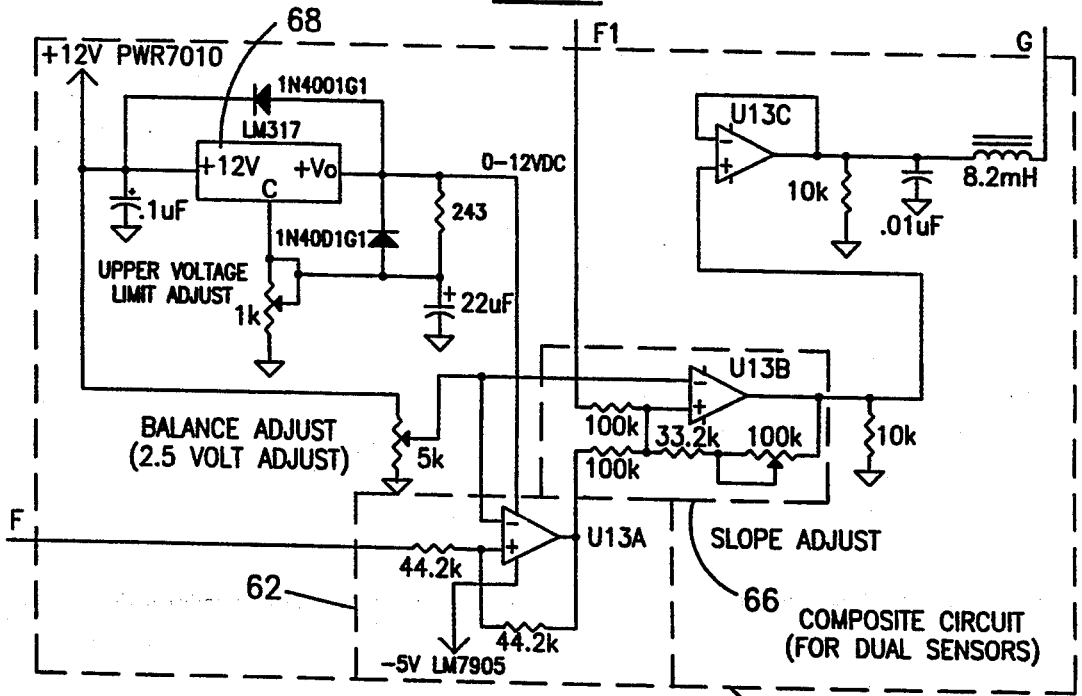
FIG. 6 is an electrical schematic of the composite circuit.

Composite circuit 60 for the system is shown in detail in FIG. 6. The composite circuit 60 comprises inverting summer amplifier 62 and comparator 66 in addition to voltage regulator U12. Inputs to the composite circuit are shown as F for the right transducer signal and F1 for the left transducer signal. The comparator 66 compares each transducer's range signal to a reference of 2.5 volts and the resulting voltage is algebraically added in inverting summing amplifier 62. Inverting summing amplifier 62 either accepts or rejects each transducer's signal to provide the 0-5 volts dc steering correction output. The purpose of comparing the two ranging signals is to eliminate the possibility of the system responding to a vehicle "bounce" instead of a valid lateral displacement as described below. The steering correction output consists of a nominal 2.5 volt dc signal indicating that no turn is required. In the event that a lateral displacement is detected, a steering correction output is generated which is an offset from the nominal 2.5 volt zero condition. The steering correction output is then sent to the vehicle's existing guidance system through switch 80. The output or composite circuit 60 may be adjusted by the operator to accommodate guidance systems requiring different input parameters than those discussed here such as nominal (or zero turn) voltage and voltage range.

Figure 8:
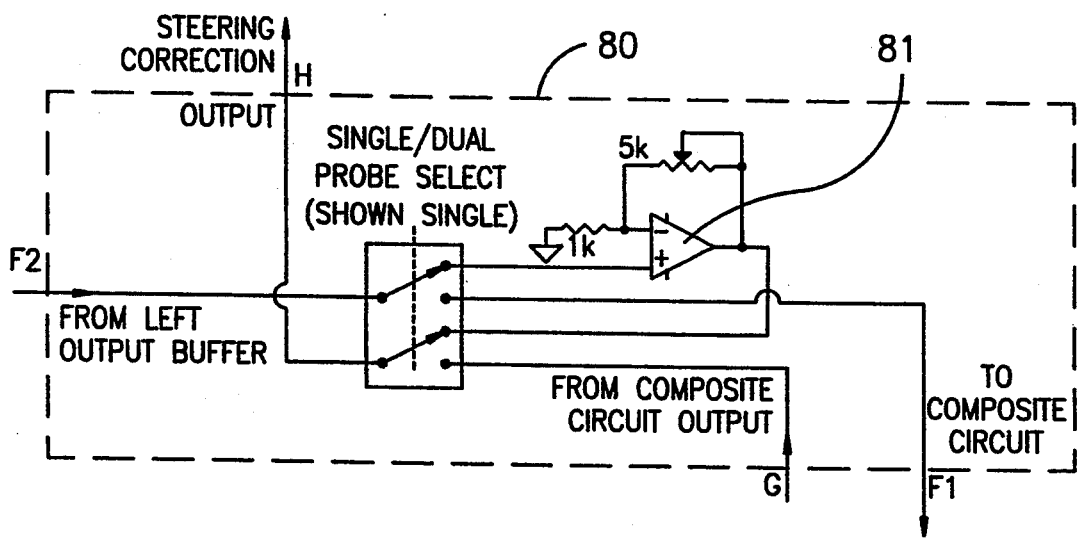
FIG. 8 is an electrical schematic of the dual/single probe select switch.

FIG. 8 shows the single/dual transducer probe select switch 80. The switch 80 allows the operator to select between single and dual transducer probe operation of the system. FIG. 8 illustrates a non-inverting amplifier 81 to normalize the output in a single sensor configuration to the 2.5 v (zero turn) voltage. This normalized output is then used as the steering correction output. In the preferred embodiment, the operator selects the dual probe mode of operation as this allows the composite circuit 60 (shown in FIG. 6) to eliminate vehicle bounce noise from the ranging data as described above.

Using two ultrasonic transducers allows the system to discriminate between valid lateral movements of the vehicle and vertical or bouncing movements of the vehicle. It is important to note that in a valid lateral displacement, one probe will move closer to the plant stalks or furrow side while the other probe moves away from its plant stalks or furrow side. If both transducers sense an increase in distance from the crop row or furrow, the sensor infers that a vertical (rather than lateral) movement has occurred, commonly referred to as "bounce," and disregards the displacement data. Only when an increase in distance detected by one transducer is reflected by a corresponding decrease in distance of the other transducer is the ranging data considered valid and processed for steering commands. In the event that a valid lateral displacement is detected by the transducers, the steering correction output from U13C in FIG. 6 is sent to the conventional guidance steering means of the vehicle.

Figure 9:
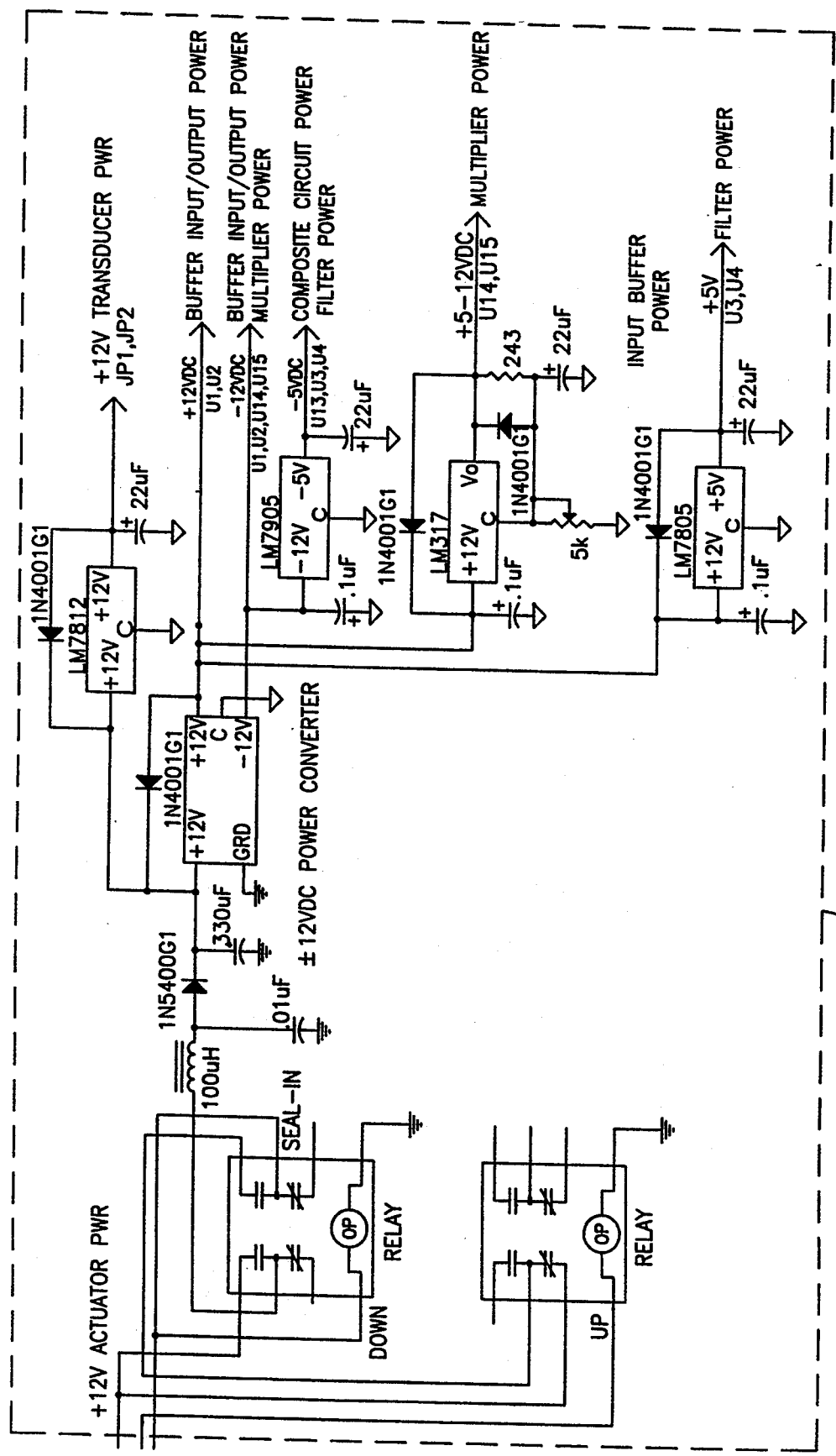
FIG. 9 is an electrical schematic of the power supply system of the invention.

FIG. 9 shows the power supply circuitry 90 of the system. Voltage regulators U5-9 and U16 produce $\pm 12$ volts dc, $\pm 5$ volts dc, $+10$ volts dc, and $+5$-12 volts dc required for various integrated circuits and components of the system.

Another likely use for the ultrasonic furrow following sensor of the present invention is to sense a "marking" furrow created by a marker, which is a special disk which plows a single small furrow. The disk is mounted on the end of a long boom which is perhaps ten feet long and mounted on a normal plow pulled behind a tractor during spring planting. The purpose of creating this "marking" furrow is to create a mark on the field, into which the farmer, once he has turned around, can lower another "feeler" blade on the opposite side of the plow, thereby providing a reference so that he can plow true parallel furrows. Without this marking/feeling system, the rows would be awkward and possibly ruin any type of gravity irrigation he may use, or make cultivation extremely difficult. No known automated steering guidance systems have been utilized to follow such a "marking" furrow.

It is apparent that numerous other modifications and variations of the present invention are possible in view of the above teachings. For example, numerous types of commercially available transducers may be used as alternatives to those mentioned in the specification. In that situation, the input and output parameters of the invention may easily be varied to accommodate such alternative transducer configurations. Additionally, transducers may possibly be fabricated which contain the lowpass filtering as well as squaring circuitry, integral to the transducer, reducing the external conditioning circuit to single/dual sensor selector switches, and the composite circuitry. Additionally, the system may be interfaced with numerous conventional steering guidance systems associated with agricultural vehicles. The steering correction output of the invention may easily be adjusted to accommodate the varying requirements of these conventional vehicle guidance systems. Still further, operator data input and display features may be added to the system for entering various parameters and displaying steering data to the operator. Finally, the electrical processing of the ranging signals from the transducers may be accomplished by means of a microprocessor or digital signal processor and associated software and interface hardware. The filtering and squaring functions may be performed as steps in a larger computer program, integral to an automatic steering control system, with signals from each ultrasonic transducer fed directly to the steering system.

Therefore it is to be understood that the above description is in no way intended to limit the scope of protection of the claims and is representative of only one of several possible embodiments of the present invention.

There has thus been shown and described an invention which accomplishes at least all of the stated objectives.

I claim:

1. A method of sensing lateral displacement of a vehicle having a guidance system relative to a desired track between two crop rows or along a furrow comprising:

providing a pair of ultrasonic sensor means for transmitting and receiving ultrasonic ranging signals;

mounting said pair of ultrasonic sensor means on a vehicle;

orienting said pair of ultrasonic sensor means on a vehicle such that said ranging signals are directed downwardly and outwardly in opposite directions from said vehicle and towards adjacent crop rows or sides of a furrow such that said ranging signals strike said rows or furrow and are reflected back into the respective sensor;

generating variable ranging outputs proportional to the distance of said sensor means from said row or furrow;

filtering said variable ranging outputs to produce filtered variable ranging outputs wherein erroneous data in said output is eliminated;

multiplying each said filtered variable ranging output by itself thereby producing squared ranging outputs and greatly increasing sensitivity to lateral displacements;

comparing said squared ranging outputs to determine the validity thereof by comparing the relative changes of the two signals wherein if both said squared ranging outputs indicate the same direction of movement, said vehicle is determined to be moving in a vertical direction and the output is not validated, and if said squared ranging outputs indicated different directions of movement, said output is validated;

computing from said validated squared ranging outputs, steering correction commands; and transmitting said steering correction commands to said guidance system whereby the vehicle is steered toward the desired track.

2. An automated ultrasonic guidance apparatus, mountable on a vehicle having a guidance steering system for steering a vehicle on a desired track between adjacent longitudinal sides of a furrow, the ultrasonic guidance apparatus comprising:

first and second transducers, each operative to emit an ultrasonic ranging signal in the direction of a respective one of said sides of said furrow, to receive the reflection therefrom and to produce a variable ranging output voltage proportional to the distance of said transducer to said furrow;

input buffer means electrically connected to said first and second transducers, for adjusting the maximum level of said variable ranging output voltage;

mounting means for mounting said first and transducers to said vehicle such that said ranging signals of said first and second transducers are directed downwardly and outwardly in opposite directions whereby upon placement of the vehicle on the desired track, said ranging signals are directed from a respective one of said transducers towards adjacent sides of a furrow such that said ranging signals strike said furrow and are reflected back into said respective transducer; and signal processing means electrically connected to said first and second transducers for receiving, combining and comparing said variable ranging outputs from said first and second transducers said signal processing means having;

filtering means electrically connected to said input buffer means for receiving said variable ranging output from said transducers and filtering out all frequency components of said output below a predetermined adjustable value, producing a filtered variable ranging output, wherein erroneous data in the output is eliminated, multiplier means electrically connected to said filter means for receiving said filtered variable ranging output from said filtering means and multiplying said output by itself thereby producing a squared ranging output signal, wherein any detected lateral deviations are greatly enhanced, said signal processing means being operative determine from said variable ranging outputs lateral displacement of said vehicle from said desired track and to convert said displacement into steering correction output by generating a voltage, the value of which is indicative of the direction and magnitude of the correction necessary to return to said desired track, and to transmit said steering correction output to said guidance steering system.

3. The invention of claim 2 wherein said signal processing means further comprises a signal composition means electrically connected to said multiplier means for comparing said squared ranging output from each of said first and second sensor means and producing said steering correction output therefrom and wherein if both ranging outputs indicate the same direction of movement, said signal composition means determines said vehicle is moving in a vertical, rather than lateral, direction and the displacement is not converted into a steering correction output.

4. The invention of claim 3 further comprising multiplier switching means having OFF and ON positions and operatively associated with said signal processing means such that the filtered variable ranging output bypasses said multiplier means upon said switch means being in the OFF position thereby connecting said signal composition means to said filtering means and wherein said multiplier is utilized upon said switch being in the ON position.

5. The invention of claim 4 further comprising a signal selection switching means electrically connected to said signal composition means for selecting a single or dual sensor configuration.

6. An automated ultrasonic guidance apparatus, mountable on a vehicle having a guidance steering system for steering a vehicle on a desired track between adjacent longitudinal sides of a furrow, the ultrasonic guidance apparatus comprising:

first and second transducers, each operative to emit an ultrasonic sound in the direction of a respective one of said sides of a furrow, to receive the reflection therefrom and to produce a variable ranging output voltage proportional to the distance of said transducer to said respective side of said furrow said variable ranging output voltage varying between zero and a maximum voltage;

input buffer means electrically connected to said first and second transducers, for adjusting the maximum level of said variable ranging output voltage;

mounting means on said vehicle for mounting said first and second transducers thereto such that said variable ranging signals are directed downwardly and outwardly in opposite directions from said vehicle and towards adjacent crop rows or sides of a furrow such that said ranging signals strike said row or furrow and are reflected back into the respective transducer;

a first and second signal processing means electrically connected to said first and second transducers for receiving and processing said variable ranging outputs, generating processed ranging outputs;

a signal composition means for combining and comparing said processed ranging outputs from said first and second signal processing means said composition means being operative to determine from said processed ranging outputs and having;

a filtering means electrically connected to said input buffer means for receiving said variable ranging output from said sensor means and filtering out all frequency components of said variable ranging output below a predetermined adjustable value thereby producing a filtered variable ranging output, wherein erroneous data in the output is eliminated, and wherein said signal composition means compares said processed ranging outputs from each of said first and second signal processing means to determine the direction of movement away from said track based on the relative changes of the said filtered variable ranging outputs wherein if both said filtered variable ranging outputs indicate the same direction of movement, said signal composition means determines lateral displacement of said vehicle from said desired track converts said displacement into a steering correction output by generating a voltage, the value of which is indicative of the direction and magnitude of the steering correction necessary to return to said desired track, and transmit said steering correction output to said guidance steering system, whereby said vehicle is steered toward the desired track.

7. The invention of claim 6 wherein said signal processing means further comprises a multiplier means electrically connected to said filter means for receiving said filtered variable ranging output from said filtering means and multiplying said output by itself thereby producing a squared ranging output signal, wherein any detected lateral deviations are greatly enhanced.

8. The invention of claim 7 further comprising multiplier switching means having OFF and ON positions and operatively associated with said signal processing means such that the filtered variable ranging output will bypass said multiplier means when said switch means is in the OFF position thereby connecting said signal composition means to said filtering means and wherein said multiplier is utilized when said switch is in the ON position.

9. The invention of claim 8 further comprising a signal selection switching means electrically connected to said signal composition means for selecting a single or dual sensor configuration.

* * * * *